Patented Aug. 23, 1932

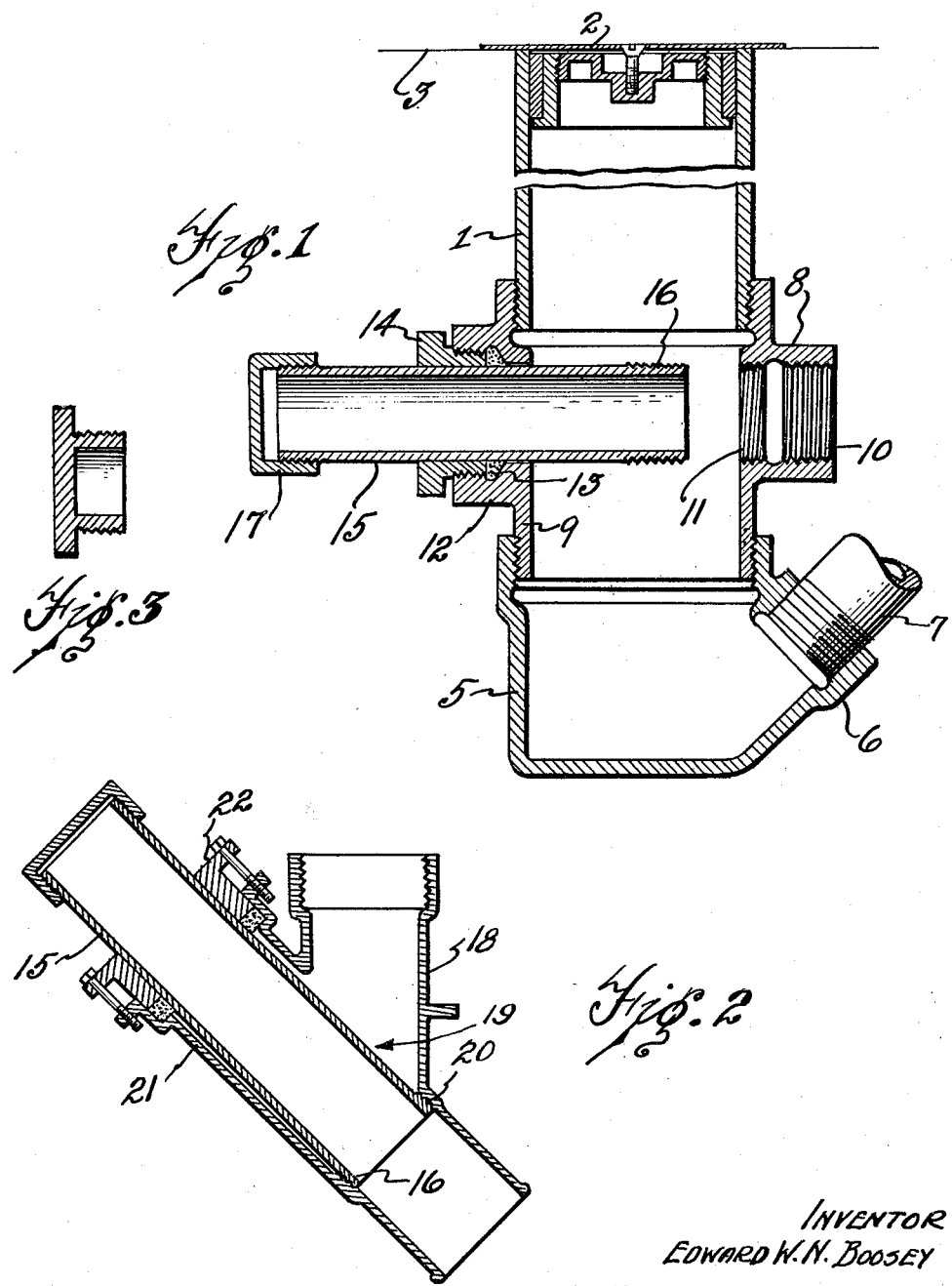

1,873,274

UNITED STATES PATENT OFFICE

EDWARD W. N. BOOSEY, OF DETROIT, MICHIGAN

ADJUSTABLE TEST CONNECTION FOR PLUMBING SYSTEMS

Application filed January 7, 1928. Serial No. 245,121.

This invention relates to adjustable test connectors for plumbing systems, and the object of the invention is to provide in conjunction with a plumbing system a device that is adapted to segregate a part of the plumbing system to enable another part thereof to be tested under fluid pressure for leakage. Such tests are usually made with water in which the segregated portion of the system is filled with water under pressure. The connector may then be adjusted or arranged to permit discharge of the test water.

In the usual plumbing systems for buildings it is necessary to test what is known as the "ground system", and also necessary to test the remainder of the system including the outlet stack while segregated from the ground system and it is also necessary to test parts of the system in the building while segregated from other parts thereof as for instance the bath tub connections and trap in conjunction therewith are required to be tested separately from the stack to which the trap discharges.

This invention seeks to provide a means which enables the outlet of the trap in such portion of the system as is connected with the bath tub to be closed or sealed to the remainder of the system and thus a test can be independently made of the trap and bath tub connections and as is hereinafter more fully described, the particular form of the adjustable connection which is the subject matter of this invention depends largely upon its position of use but the principle involved is identical in any of the possible forms which may be employed, two of which are shown herein. These and other objects and the several novel features of the invention are more fully described and claimed, and the preferred embodiment of my invention is shown in the accompanying drawing in which—

Fig. 1 is a sectional view of my improved adjustable connection for use with a trap similar to that used in conjunction with the bath tub fittings.

Fig. 2 is another form of the connecter as more particularly adapted for use in segregating the stack of the building from the ground system.

In the form of the invention shown in Fig. 1 an ordinary bath trap or cleanout trap is shown which has a body 1, a cap 2 for the opening thereof at the floor line 3. The base 5 of the body has a threaded hub on one side for the connection of the piping 7 which may lead to a bath tub, wash basin or other fixture. This body is also provided with a threaded hub 8. While I have here shown this hub as being formed on the cylindrical part 9 providing part of the trap body it is to be understood that these parts may be made integral or otherwise as may be desired. In any event this hub 8 has an internally threaded end portion 10 and an inner internally threaded portion 11 and diametrically opposite the hub 8 is provided a hub 12 in axial alignment with the hub 8. The hub 12 has a seat for the packing 13 and is threaded to receive a gland 14, the gland being centrally apertured and the bottom of the hub 12 having an aperture to receive a tube 15 threaded at the inner end 16 to engage the threads 11 of the hub 8. This tube, as here shown, is provided with a removable cap 17 at its outer end and it is evident that by moving the connector member or tube 15 into threaded engagement with the hub 8 the trap and the connections through the piping 7 leading thereinto are isolated from that part of the system that connects with the threaded portion 10 of the outlet hub. This usually is a pipe line leading to the stack. It will be readily seen that when this adjustable connector is in place with the inner end threaded into the inner threads 11 of the hub 8 the system connected with the trap is sealed relative to that part of the system connected with the hub 8 and thus water may be introduced under pressure in any approved manner as for instance through the outlet of a bath tub or wash basin and such portion of the system tested while isolated from the discharge part of the plumbing system. Subsequently the connector 15 is withdrawn from the position shown in Fig. 1 permitting the water to discharge through the outlet. Subsequent to discharge of the test water, the adjustable connection and gland may be removed and a single plug such as is shown in Fig. 3 is screwed into the member 12 against the packing therein to seal the said hub.

These tests are usually made before completion of the building—that is, while the walls are unplastered and the plumbing accessible and thus the whole system is put in place and with the hub 12 provided with the closure plug. When the system has been erected and in condition to be tested this plug is removed and my adjustable connector put in place as in the manner described.

The same principle of operation and general arrangement of parts is indicated in Fig. 2 in which 18 indicates the base of the stack and 19 the outlet to the ground system. In order that my connector may be utilized with such an arrangement of parts the member 19, at its point of junction with the part 18 is threaded as indicated at 20 and an elongated hub 21 is provided in axial alignment therewith permitting introduction of the connector 15, with the inner threaded end 16 in threaded engagement with the threads 20. A gland of slightly different form from that shown in Fig. 1 is indicated at 22 and seals the connector to the hub 21. Thus, by introduction of the member 16 in the position shown in the drawing the stack and the parts of the plumbing system connected therewith are isolated from the ground system and may be tested in the usual way whereupon, by withdrawal of the connector from the threads 20, the test water may be permitted to flow through the ground system to the sewer. Subsequent to making the test the connector may be removed and a plug introduced in the hub 21 sealing the same. This plug may be of any approved form similar to that shown in Fig. 3.

The member 15 is shown as a tubular member with a removable cap 17 and thus it may be seen when the member 15 is in threaded engagement with the threads 11 of the hub 8 the parts of the system connected with the hub 8 may be tested by fluid under pressure introduced through the connector 15. In such case the discharge end of the portions of the plumbing under test should be plugged. Thus, by introducing a connector in the manner shown in Fig. 1, for instance, either the system connected with the inlet 7 may be tested or that part of the system connected with the outlet 8 may be tested independently of the trap 1 and the plumbing elements connected therewith through the line 7.

From the foregoing it will be evident that the invention consists of the combination with a plumbing element having a discharge opening and an opening in the side wall in axial alignment therewith through which the connector is introduced to engage the outlet opening and to seal that part of the system connected with the element from that part of the system connected with the outlet.

Having thus fully described my invention, what I claim and desire to secure by Letters Patent of the United States is—

In a plumbing device, a tubular body having an opening at one end through which access may be had to the interior, a plug for sealing the same, an outlet conduit at the opposite end, a threaded hub on one side of the body providing an opening to the interior adapted for the connection of a conduit therewith, the said hub having an internal right hand thread at the outer end and an internal right hand thread at the point of opening into the body and a second hub about an opening to the interior of the body diametrically opposite the first named hub, a tubular element insertible through the second hub and threaded at one end for engagement with the second named threads of the first hub, and a packing gland for sealing the tubular element in the second hub.

In testimony whereof I sign this specification.

EDWARD W. N. BOOSEY.